United States Patent
Jibbe et al.

(10) Patent No.: US 8,065,422 B2
(45) Date of Patent: *Nov. 22, 2011

(54) METHOD AND/OR APPARATUS FOR CERTIFYING AN IN-BAND MANAGEMENT APPLICATION OF AN EXTERNAL STORAGE ARRAY

(75) Inventors: Mahmoud K. Jibbe, Wichita, KS (US); Srirang Heroor, Karnataka (IN)

(73) Assignee: Netapp, Inc., Sunnyvale, CA (US)

( * ) Notice: Subject to any disclaimer, the term of this patent is extended or adjusted under 35 U.S.C. 154(b) by 301 days.

This patent is subject to a terminal disclaimer.

(21) Appl. No.: 12/324,224

(22) Filed: Nov. 26, 2008

(65) Prior Publication Data

US 2010/0131581 A1    May 27, 2010

(51) Int. Cl.
 *G06F 15/16* (2006.01)
 *G06F 9/44* (2006.01)
(52) U.S. Cl. ........ 709/228; 709/227; 709/229; 717/124; 717/168
(58) Field of Classification Search .................. 709/227, 709/228, 229; 717/124, 168
See application file for complete search history.

(56) References Cited

U.S. PATENT DOCUMENTS

| | | | | |
|---|---|---|---|---|
| 5,706,432 A * | 1/1998 | Elko et al. | | 709/213 |
| 6,065,037 A * | 5/2000 | Hitz et al. | | 709/200 |
| 6,195,765 B1 * | 2/2001 | Kislanko et al. | | 714/38 |
| 6,353,837 B1 * | 3/2002 | Blumenau | | 1/1 |
| 6,360,268 B1 * | 3/2002 | Silva et al. | | 709/227 |
| 6,565,443 B1 * | 5/2003 | Johnson et al. | | 463/43 |
| 6,584,554 B1 * | 6/2003 | Dahlen et al. | | 711/170 |
| 7,266,637 B1 * | 9/2007 | van Rietschote | | 711/112 |
| 7,392,149 B2 * | 6/2008 | Bonilla | | 702/123 |
| 7,437,614 B2 * | 10/2008 | Haswell et al. | | 714/38.13 |
| 7,506,375 B2 * | 3/2009 | Kanda et al. | | 726/25 |
| 7,567,257 B2 * | 7/2009 | Antoch et al. | | 345/619 |
| 7,665,098 B2 * | 2/2010 | Kavalam et al. | | 719/328 |
| 7,725,473 B2 * | 5/2010 | Lamb et al. | | 707/758 |
| 7,783,799 B1 * | 8/2010 | Sivertsen | | 710/62 |
| 2004/0015516 A1 * | 1/2004 | Harter et al. | | 707/104.1 |
| 2004/0122917 A1 * | 6/2004 | Menon et al. | | 709/219 |
| 2004/0139240 A1 * | 7/2004 | DiCorpo et al. | | 710/3 |
| 2004/0153639 A1 * | 8/2004 | Cherian et al. | | 713/2 |
| 2005/0091441 A1 * | 4/2005 | Qi et al. | | 711/5 |
| 2005/0172047 A1 * | 8/2005 | Pettey | | 710/20 |
| 2005/0251522 A1 * | 11/2005 | Clark | | 707/100 |
| 2006/0114917 A1 * | 6/2006 | Raisch | | 370/401 |
| 2006/0168564 A1 * | 7/2006 | Zhang et al. | | 717/121 |
| 2008/0209275 A1 * | 8/2008 | Kwan et al. | | 714/38 |
| 2009/0037353 A1 * | 2/2009 | Greenwald et al. | | 706/20 |
| 2009/0132760 A1 * | 5/2009 | Flynn et al. | | 711/113 |
| 2010/0138823 A1 * | 6/2010 | Thornley | | 717/174 |

OTHER PUBLICATIONS

StorageTek, SANtricity Storage Manager—ES1567-2-E1, First Edition, 2004, all pages.*

* cited by examiner

*Primary Examiner* — Hieu Hoang
(74) *Attorney, Agent, or Firm* — Haynes and Boone, LLP

(57) ABSTRACT

A method comprising the steps of (A) generating a call for a first operating system at a host, (B) sending the call for the first operating system from the host to a storage array over a network, (C) generating a response to the call for the first operating system from the host, (D) sending the response from the storage array to the host over the network and (E) capturing and storing the response in a device.

16 Claims, 6 Drawing Sheets

METHOD AND/OR APPARATUS FOR CERTIFYING AN IN-BAND MANAGEMENT APPLICATION OF AN EXTERNAL STORAGE ARRAY

CROSS REFERENCE TO RELATED APPLICATIONS

The present application may relate to co-pending application Ser. No. 12/238,858, filed Sep. 26, 2008, Ser. No. 61/046,815, filed Apr. 22, 2008, Ser. No. 12/143,123, filed Jun. 20, 2008, Ser. No. 61/080,806, filed Jul. 15, 2008, Ser. No. 61/080,762, filed Jul. 15, 2008, Ser. No. 12/178,064, filed Jul. 23, 2008 and Ser. No. 61/100,034, filed Sep. 25, 2008, which are each hereby incorporated by reference in their entirety.

FIELD OF THE INVENTION

The present invention relates to storage arrays generally and, more particularly, to a method and/or apparatus for certifying an in-band management application of an external storage array.

BACKGROUND OF THE INVENTION

Conventional test environments encounter various issues. Included in those issues is the need for hardware like arrays and switches needed to test different operating system (OS) platforms (i.e., Windows, Unix, etc.). Furthermore, not all teams involved in the development of a symbol interface can afford to procure storage arrays to test a host software interface over a fibre channel (FC) implementation. Additional unnecessary use of arrays and fibre channel networks occurs during iterative testing when using in-band management applications over different OS platforms.

Conventional approaches use a number of hardware and software applications to certify management software on different OS platforms. Conventional approaches also need engineers to manually troubleshoot problems faced while testing management software of storage arrays on different OS platforms. Conventional approaches have a number of disadvantages. With such conventional approaches the cost of hardware resources, engineers and time is great. Avoiding duplication of efforts is also a main concern. Not all design teams can afford the expense to buy and maintain hardware resources while certifying the same storage manager over different OS platforms.

It would be desirable to implement a method and/or apparatus for certifying an in-band management application of an external storage array.

SUMMARY OF THE INVENTION

The present invention concerns a method that includes an example embodiment including the steps of (A) generating a call for a first operating system at a host, (B) sending the call for the first operating system from the host to a storage array over a network, (C) generating a response to the call for the first operating system from the host, (D) sending the response from the storage array to the host over the network and (E) capturing and storing the response in a device.

Objects, features and advantages of the present invention include providing a device, that may (i) capture a symbol call (and corresponding response) from an array (e.g., in the form of an Object Graph Structure), (ii) provide a mechanism of interpreting a symbol call and a link to a proper symbol response, (iii) remove the need for additional hardware to certify in-band SANtricity/Simplicity with SMagent in different environments (e.g., operating systems) and/or (iv) be used in block Storage Array Network products (e.g., SAN) or Network Array Storage (NAS).

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
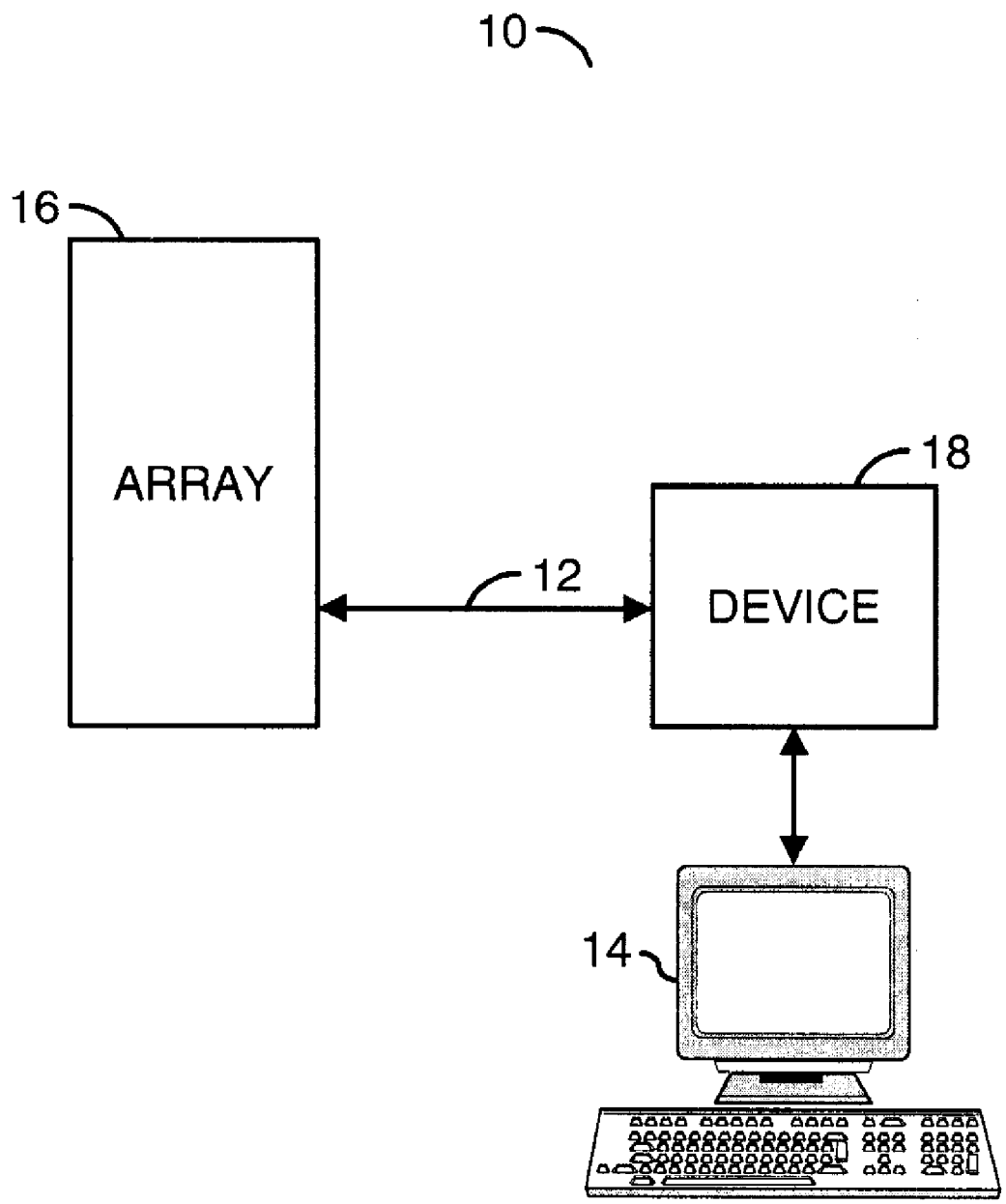
FIG. 1 is a block diagram of an array configuration.

Referring to FIG. 1 a block diagram of a system 10 is shown implementing an array configuration in accordance with an embodiment of the present invention. The system 10 may include a network 12, a module 14, a module 16, and a module 18. The network 12 may represent a fibre channel (FC) network. The module 14 may represent a host device. The module 16 may represent a storage array (or controller). The module 18 may represent a device. The system 10 illustrates an example of an array configuration implementing in-band management over the fibre channel network 12.

Current practice during testing (or certifying) of storage management software is to install the same software applications on different operating system platforms (e.g., Linux, Solaris, Windows, etc). The software applications are then used to manage storage arrays over in-band management. Manufacturers of storage devices need to validate the behavior of management software applications before releasing the management software to customers. For example, management software applications may make a symbol call over the FC network 12 through an Universal Transport Mechanism (UTM) Lun to the storage array 16. The storage array 16 may in turn process the request and send the request to the host 14 requesting the symbol call. The request from the host 14 may be used to create volumes, delete volumes or requesting information about the storage array 16. The symbol calls may be addressed over the FC network 12 (e.g., In-Band management).

If a symbol call needs to be tested through in-band management, the host 14 may make the function call encapsulated in a fibre channel (FC) frame packet to the storage array 16. The storage array 16 may receive the call and execute the call. The storage array 16 may send an appropriate return code to a client and populate the structure in an Object Graph. Once the host 14 deciphers the data in the Object Graph, the host 14 may display the appropriate information in a graphical user interface (GUI).

In one example, a user using the storage array 16 may use a management software application to manage the storage array 16. In another example, the software applications may need to be validated on different operating system platforms. Since the return code normally remains the same, the same symbol call may be sent by the management software application running on any OS platform. It would be desirable to eliminate the need to implement additional hardware (e.g., additional storage arrays) during iterative testing. This may be done by introducing a component (e.g., the device 18) between the storage array 16 and the host 14. The device 18 may have the following capabilities (i) publish a UTM Lun (e.g., access volume), (ii) store and retrieve FC frame packets for different symbol calls sent over the FC network 12 and (iii) store an Object Graph of the respective symbol call. The device 18 may eliminate the need for additional arrays while carrying out iterative testing on different OS platforms.

Figure 2:
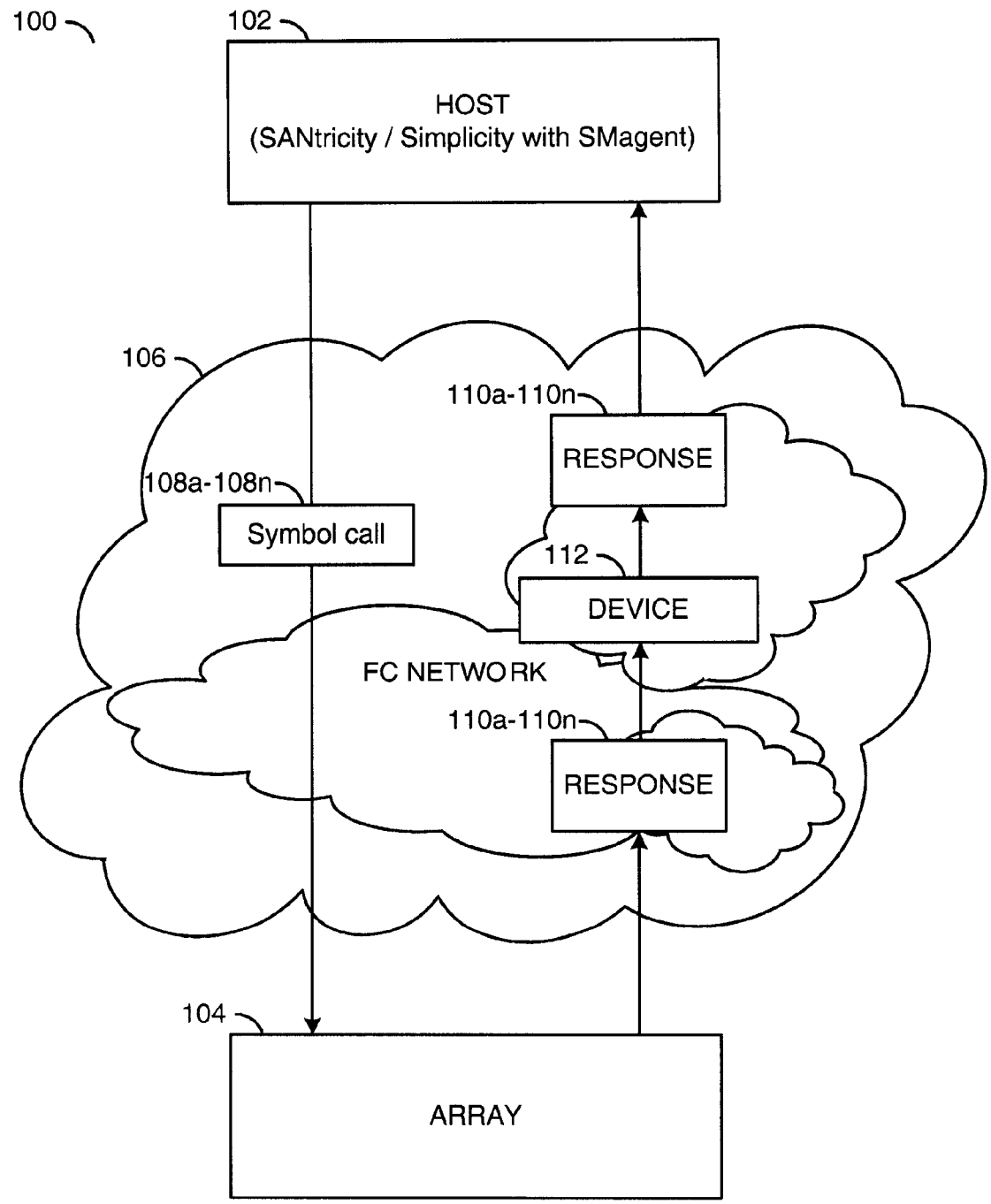
FIG. 2 is a block diagram of an embodiment of the invention in a storage phase.

Referring to FIG. 2, a block diagram of system 100 is shown in accordance with an example embodiment of the present invention. The system 100 generally comprises a module 102, a module 104, and a block 106. The module 102 may be implemented as a host module. In one example, the module 102 may be implemented as a module (e.g., SANtricity/Simplicity) with a management agent (e.g., SMagent). The module 104 may be implemented as a storage array. For example, the module 104 may represent an array of disk drives or other storage devices (e.g., solid state storage, etc.). The module 102 and/or the module 104 may represent circuits and/or blocks that may be implemented as hardware, software, a combination of hardware and software, or other implementation. The block 106 may represent a network (e.g., a fibre channel network).

The network 106 generally comprises a number of blocks 108a-108n, a number of blocks 110a-110n, and a module 112. The blocks 108a-108n and the blocks 110a-110n may be implemented as data packets (e.g., 1000 bits, 1500 bits, etc.). In one example, the packets 108a-108n may each store data used to initiate a symbol call to the storage array 104. In one example, the packets 110a-110n may each store data representing a response (or return code) from the storage array 104. The symbol calls 108a-108n and the responses 110a-110n may be encoded inside a particular type of packet (e.g., a fibre channel frame packet, a code, etc.). The module 112 may be implemented as a device circuit. The module 112 may represent a circuit and/or a block that may be implemented as hardware, software, a combination of hardware and/or software, or another type of implementation.

Various embodiments of the system 100 have multiple benefits. For example, the use of the storage array 104 during testing may be eliminated. The storage array 104 may be used once while building a database for the device 112. Such an implementation may reduce the risk of running into a configuration issue when operating the storage array 104 after testing has been completed. In another example, the responses 110a-110n sent by the storage array 104 in response to one of the symbol calls 108a-108n from the host 102 may be implemented to not be dependent on a particular operating system (OS). The symbol calls 108a-108n may be initiated from the host 102 (or another host connected to the network 106) running one or more of a number of types of operating systems (e.g., Windows, Linex, etc.). In another example, the time needed to test the symbol calls 108a-108n will normally be less than the testing time in an environment without the system 100. For example, the host 102 does not normally have to wait for the operation on the storage array 104 to complete. The system 100 may reduce resources needed to certify in-band management applications.

The flow for testing the storage array 104 may be broken down into two phases (i) the storage phase and (ii) the retrieval phase. The storage phase may use a minimum configuration of the host 102, the device 112 and the array 104.

The host 102 may normally have a SANtricity/Simplicity with SMagent application installed as a hardware device and/or as a software application.

Figure 3:
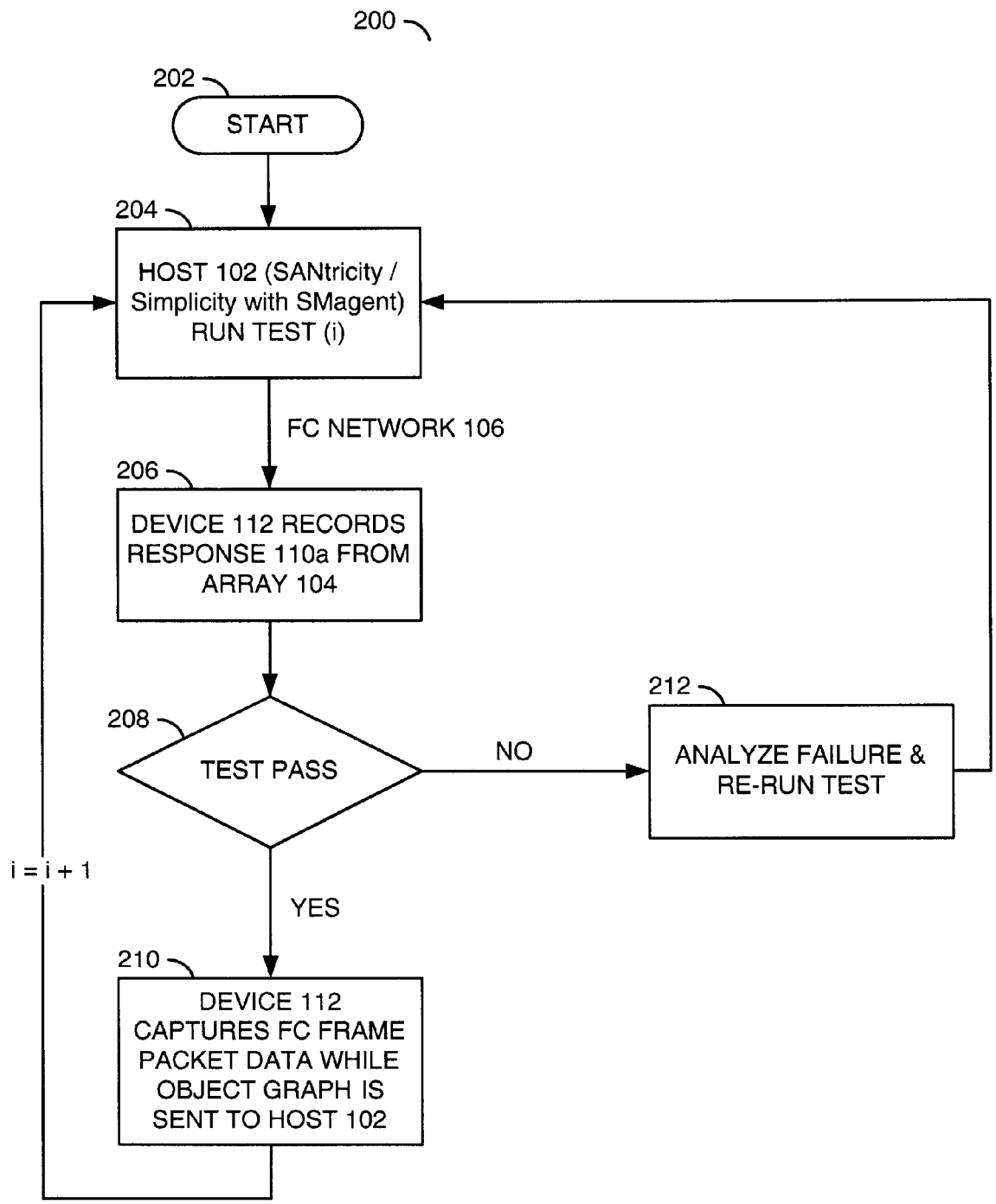
FIG. 3 is a flow chart of the process of an embodiment of the invention in the storage phase.

Referring to FIG. 3, a diagram of a process 200 is shown. The process 200 may illustrate the system 100 in the storage phase. The process 200 generally comprises a step 202, a step 204, a step 206, a decision step 208, a step 210 and a step 212. Each of the steps 202-212 may be implemented as a step, a state in a state diagram, or another type of step/state. The step 202 may start the process 200. The step 204 may instruct the host 102 (e.g., SANtricity/Simplicity with SMagent management software) to run an initial test (e.g., a test i). The step 206 may instruct the device 112 to record the response 110a from the storage array 104. The decision step 208 may determine if the test passes. If the test passes, then the process 200 may continue to the step 210. The step 210 may instruct the device 112 to capture data in a fibre channel (FC) frame packet. If the test does not pass, then the process 200 may move to the step 212. The step 212 may analyze the failure and re-run the test. After the process 200 moves to the step 212 then the process 200 may return to step 204.

The testing described may include one or more of a variety of tests. In one example, a suite of tests may be implemented as one test after the next. For example, the first test in the suite may test the function of a "create snapshot" volume operation where i=0 (e.g., a variable "i" gets initialized to zero). The host 102 may send a specific symbol call (e.g., CREATE_SNAPSHOT_VOLUME) with the relevant parameters to the storage array 104 over the fibre channel network 106. The symbol call CREATE_SNAPSHOT_VOLUME may be encoded inside a FC frame packet with a corresponding small computer system interface (SCSI) command. The storage array 104 may receive the symbol call CREATE_SNAPSHOT_VOLUME, execute the function requested, send back an appropriate return code (e.g., the response 110a) and fill in an Object Graph. The following TABLE 1 illustrates an example of an Object Graph:

TABLE 1

| | |
|---|---|
| VOLUME— | 0x1dbc877c |
| volumeHandle: | 0x3 |
| raidLevel: | 0x1 |
| dssPrealloc: | 0x1 |
| absMaxSegSize: | 0x200000 |
| offline: | 0x0 |
| sectorOffset: | 0x6ac000 |
| blk/segSize: | 0x200/0x10000 |
| capacity: | 0x80000000 |
| reconPriority: | 0x1 |
| preReadRedun: | 0x0 |
| media scan: | 0x0/0x0 |
| status/action: | 0x1 OPTIMAL/0x1 |
| cache: | CME RCA RCE WCE |
| cache modifier: | 0x8 |
| readAheadMult: | 0x0 |
| WWN: | 60 0a 0b 80 00 29 ec 6e 00 00 34 66 48 3c d8 f4 |
| volumeGroupRef: | 04 00 00 00 60 0a 0b 80 00 29 ed 38 00 00 a7 1d 48 3b 71 cd |
| volumeRef: | 02 00 00 00 60 0a 0b 80 00 29 ec 6e 00 00 34 66 48 3c d8 f4 |
| currentMgr: | 07000000000000000000000001 |
| preferredMgr: | 07000000000000000000000001 |
| label: | 00 76 00 6f 00 6c 00 75 00 6d 00 65 00 2d 00 32 00 2d 00 52 00 31 |
| label: | volume-2-R1 |
| permissions: | MAP = N, SNAP = N, FORMAT = N RECONFIG = Y, READ = Y, WRITE = Y MIRROR PRIMARY = N, MIRROR SECONDARY = N COPY SOURCE = N, COPY TARGET = N |

The device 112 may then capture the return code 110a (e.g. the flow of SCSI commands) when the FC frame packet is sent from the storage array 104. The return code 110a may be passed on to the host 102 from the device 112. The management software running on the host 102 may decode a corresponding return code 110a (e.g., RETCODE_OK) embedded in the FC frame packet and may update the Object Graph from the storage array 104 via a remote procedure call (RPC). The following TABLE 2 illustrates a number of examples of return codes (e.g., the responses 110a-110n) the array 104 may send to the host 102 for a particular symbol call 108a-108n:

TABLE 2

Few Return Codes for Creation of SnapShot Volume

| | |
|---|---|
| RETCODE_MAX_SNAPS_EXCEEDED | Exceeded max snapshots per storage array |
| RETCODE_INVALID_BASEVOL | Cannot create snapshot of this base volume |
| RETCODE_SNAPSHOT_FEATURE_DISABLED | Snapshot feature is disabled |
| RETCODE_INVALID_REPOSITORY_LABEL | Label specified for repository is invalid |
| RETCODE_INVALID_SNAP_LABEL | Label specified for snapshot is invalid |

While the Object Graph is being sent to the host 102, the device 112 may capture the data in the FC frame packet, store the data locally and pass the FC frame packet to the host 102. The host 102 may then prepare to execute the next test in the suite (e.g., i=i+1, where 'i' gets incremented by 1). If the test fails, analysis is generally done to determine the cause of the failure. Such a failed test may then be re-executed (e.g., i=0, where the value of 'i' remains unchanged).

The storage phase generally takes place once in a particular iterative test cycle. In the storage phase, the symbol calls 108a-108n pertaining to one operating system (e.g., Windows, Linex, etc.) may be tested. The object structures may be captured and stored locally in the device 112. In the retrieval phase, the symbol calls 108a-108n tested in the storage phase may be tested for different operating systems (e.g., AIX, Linux, Solaris, HP-UX, etc.) using the technique explained in connection with FIG. 4.

Figure 4:
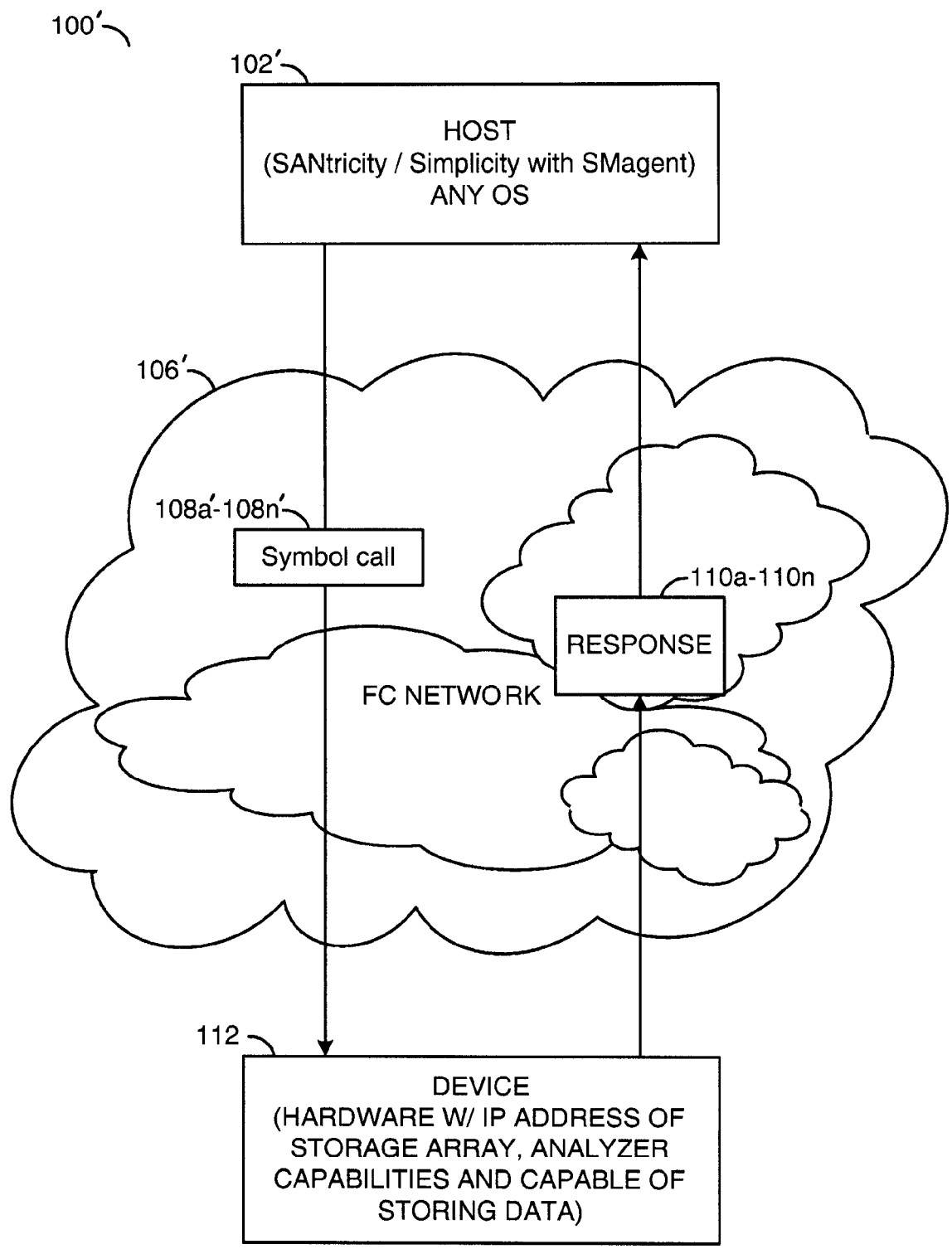
FIG. 4 is a block diagram of an embodiment of the invention in a retrieval phase.

Referring to FIG. 4, a block diagram of a system 100' is shown. The system 100' may represent an example of an embodiment of the present invention in the retrieval phase. The system 100' generally comprises a module 102', a block 106', a number of packets 108a'-108n', the responses (or return codes) 110a-110n, and the device 112. The circuit 102' may be implemented as a host module. In one example, the host module 102' may be implemented as a host (e.g., SANtricity/Simplicity) with management software (e.g., SMagent). The host module 102' may run any one or more of a number of operating systems. The block 106' may be implemented as a network (e.g., a fibre channel network). The packets 108a'-108n' may be implemented as data packets (e.g., 1000 bits, 1500 bits, etc.). In one example, the packets 108a'-108n' may each represent a symbol call to the device 112. In one example, the device 112 may be implemented as a hardware device with a network interface (e.g., an IP address of the storage array 104), analyzer capabilities and/or the capability to store data (e.g., a memory).

In one implementation, the minimum configuration for the retrieval phase may be the host 102' (e.g., SANtricity/Simplicity with SMagent Management Software installed) and the device 112 (with analyzing capability, a fibre channel network interface and storage capability). The host 102' may receive the Universal Transport Mechanism (UTM) Lun from the device 112. After the test suite completes in the storage phase the technique described below in connection with FIG. 5 may be used to test the symbol calls 108a'-108n' from other operating systems. The suite may begin testing the calls in the suite in the same series of symbol calls 108a'-108n' as in the storage phase.

Figure 5:
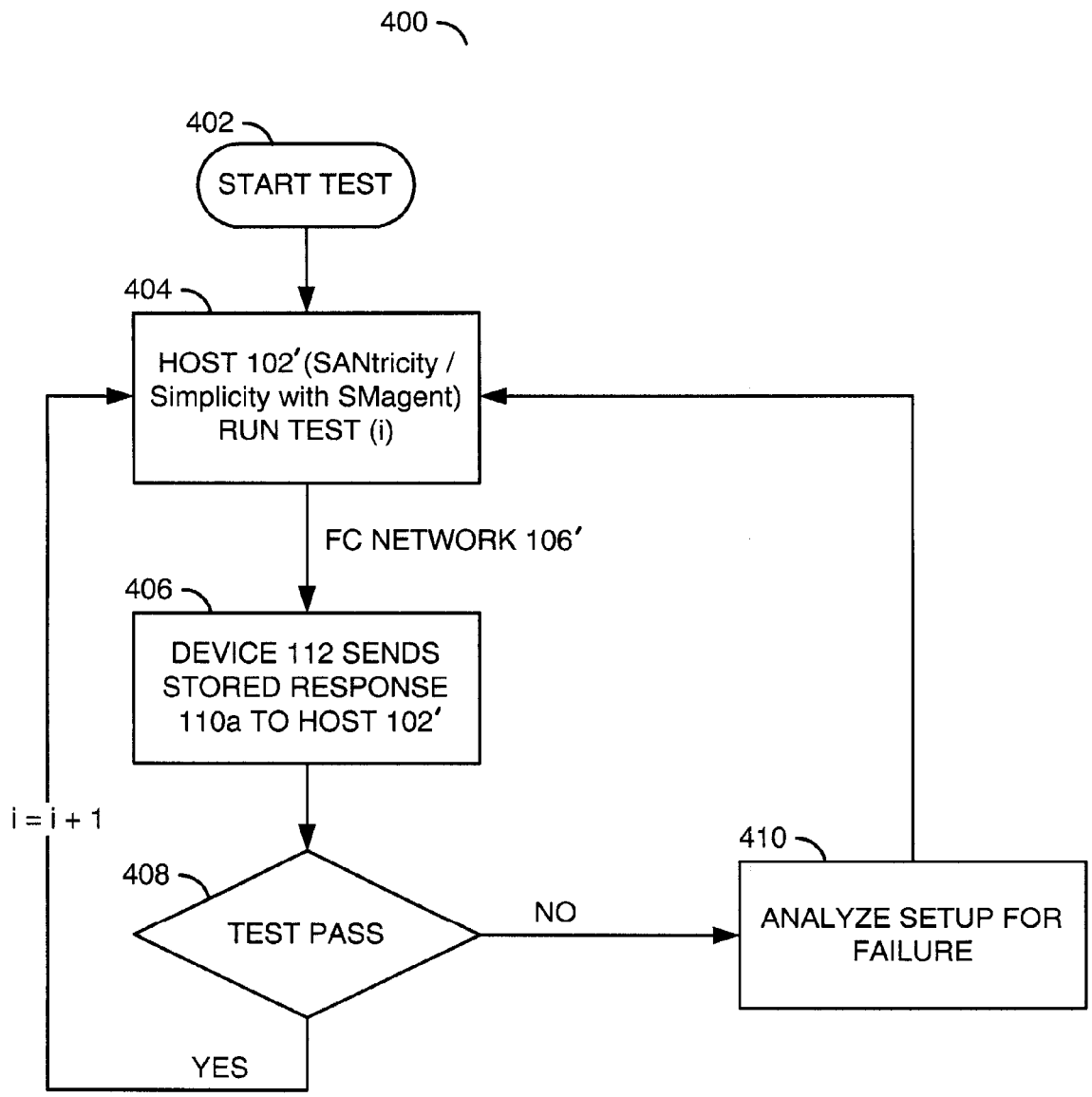
FIG. 5 is a flow chart of a process of an embodiment of the invention in the retrieval phase.

Referring to FIG. 5, a diagram of a process 400 is shown. The process 400 may illustrate an example of the system 100' in the retrieval phase. The process 400 may comprise an initiator step 402, a step 404, a step 406, a decision step 408 and a step 410. The steps 402-410 may be implemented as steps, a state in a state diagram, or other types of steps. The step 402 may start the process 400. The step 404 may instruct the host 102' (e.g., SANtricity/Simplicity with SMagent Management Software) to run a test (e.g., i). In the step 406, the device 112 may receive a symbol call (e.g, 108a') and send the corresponding stored response (e.g., the response 110a) back to the host 102'. The decision step 408 may decide if the test passes. If the test passes, then the process 400 normally returns to the step 404. If the test does not pass, then the process 400 moves to the step 410. The step 410 analyses the setup for failure. After the process 400 goes to the step 410, the process 400 returns to the step 404.

In one example, the management software running in the host 102' may continue to send the set of symbol calls 108a'-108n' with similar parameters to the device 112 (e.g., i=0, where 'i' is initialized to zero). The device 112 may decipher the request using the analyzer functionality and send the corresponding return codes 110a-110n to the host 102'. Upon receiving the responses 110a-110n, the management software running on the host 102' may process the responses 110a-110n and retrieve an output (e.g., an Object Graph). The host 102' may send a request for the Object Graph to the device 112. The host 102' may then decipher the Object Graph and decide if the test is a success (or passes). If the test passes, the host 102' may proceed with the next test in the suite (e.g., i=i+1, where 'i' gets incremented by 1). In case of a failure, the set up may need to be inspected for issues and the test will normally be re-executed (e.g., i=0, where the value of 'i' remains unchanged).

Figure 6:
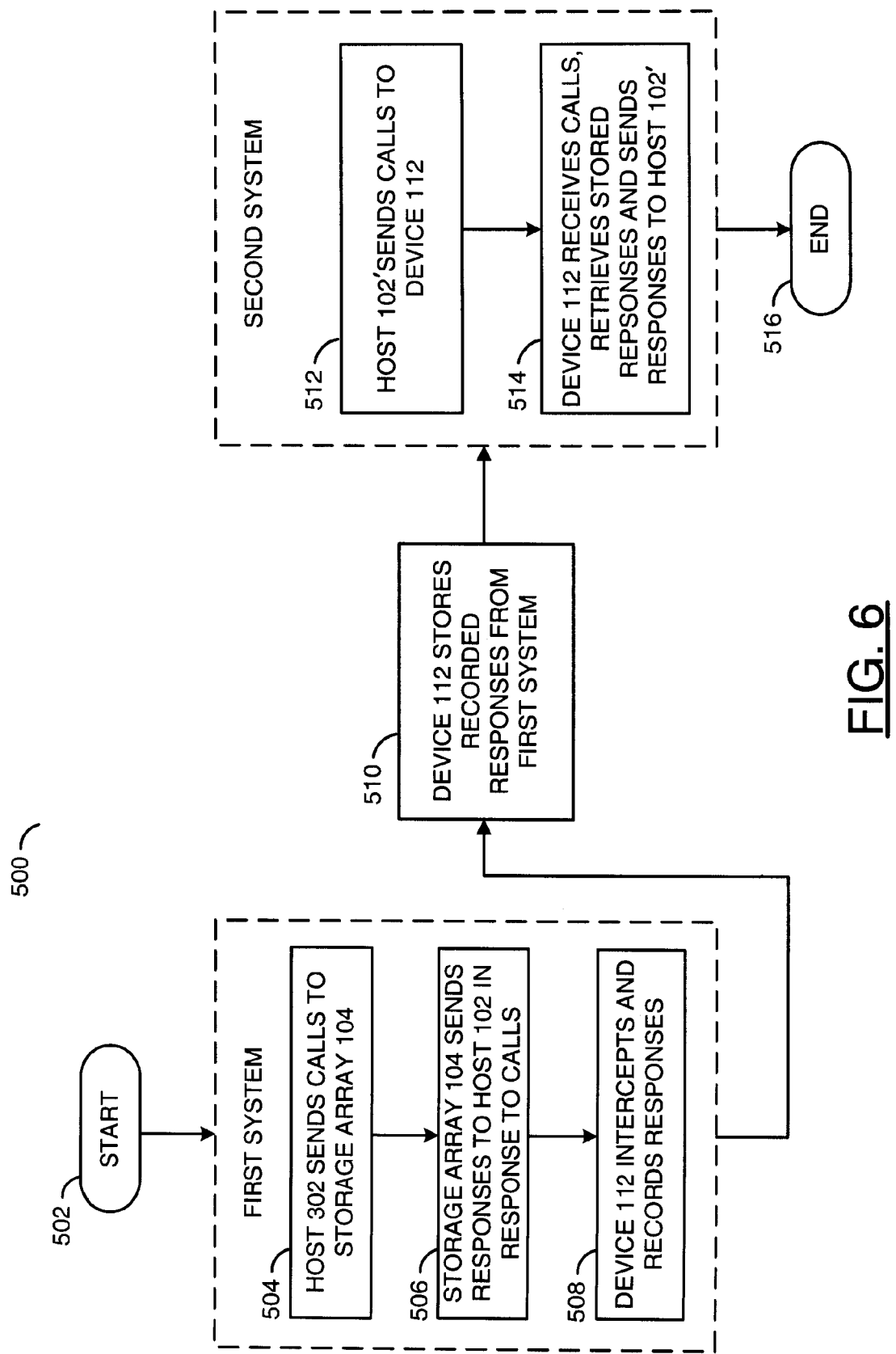
FIG. 6 is a more detailed flow chart in accordance with an embodiment of the present invention.

Referring to FIG. 6, a flow diagram of a process 500 is shown. The process 500 generally comprises a step 502, a step 504, a step 506, a step 508, a step 510, a step 512, a step 514, and a step 516. The steps 502-516 may be implemented as steps, a state in a state diagram, or other types of steps. The process 500 may start in the step 502. In the step 504, the host 102 may send a first set of calls (e.g., 108a-108n) to the storage array 104 for a first system (or server) having a first operating system (e.g., Windows, Linux, etc.). In the step 506, the storage array 104 may send a set of responses (e.g., 110a-110n) to the host 102 in response to the first set of calls 108a-108n. In the step 508, the device 112 may intercept and record the set of responses 110a-110n from the storage array 104. In the step 510, the device 112 may store the set of recorded responses 110a-110n. In the step 512, the host 102' may send a second set of calls (e.g., 108a'-108n') to the storage array 104 for a second system (or server) having a second operating system (e.g., Windows, Linux, etc.) different from the first operating system. In the step 514, the device 112 may receive the second set of calls 108a'-108n' from the second system. In the step 514, the device 112 may directly retrieve the previously stored set of responses 110a-110n. In the step 514, the device 112 may send the set of responses 110a-110n (e.g., previously used for testing the first system) to the host 102'. In the step 516, the process 500 may end. In one embodiment, the process 500 may be repeated for several different operating systems. In contrast to testing the first system where the device 112 intercepts the responses 110a-110n from the storage array 104, when testing the second system the device 112 may directly retrieve the previously stored responses 110a-110n. By using the previously stored set of responses 110a-110n, the method 500 may reduce hardware duplication when testing the second system.

The function performed by the flow diagrams of FIGS. 3, 5 and 6 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer (or processor) to perform a process in accordance with the present invention. The storage medium may include, but is not limited to, any type of disk including floppy disk, optical disk, CD-ROM, magneto-optical disks, ROMs, RAMS, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. A method for testing a storage management software across different operating systems, the method comprising:
   generating, by said storage management software, a first symbol call for a first operating system at a host;
   sending said first symbol call for said first operating system from said host to a storage array over a network, wherein said network comprises a fibre channel network;
   generating, by said storage array, a first symbol response to said first symbol call for said first operating system from said host;
   sending said first symbol response from said storage array to a device over said network;
   capturing and storing said first symbol response in said device;
   sending said first symbol response from said device to said host over said network;
   generating, by said storage management software, a second symbol call for a second operating system at said host, the second operating system being different from the first operating system;
   sending said second symbol call for said second operating system to said device; and
   sending said first symbol response from said device to said host in response to receiving said second symbol call for said second operating system without providing additional storage arrays for testing said second symbol call for said second operating system.

2. The method according to claim 1, wherein said device is configured to publish a universal transport mechanism Logical Unit Number (LUN).

3. The method according to claim 1, wherein said storage array comprises one or more solid state storage devices.

4. The method according to claim 1, wherein said host comprises a hardware device having installed thereon the storage management software.

5. The method according to claim 1, wherein said first symbol call for said first operating system is encoded in a fibre channel frame packet.

6. The method according to claim 1, wherein said capturing and storing further comprises: storing an object graph of said first symbol call for said first operating system.

7. A system for testing a storage management software across different operating systems, the system comprising:
   a host comprising a processor and a memory accessible by the processor, the host generating, by said storage management software, a first symbol call for a first operating system and sending said first symbol call for said first operating system to a storage array over a network, wherein said network comprises a fibre channel network;
   said storage array receiving said first symbol call for said first operating system, generating a first symbol response to said first symbol call for said first operating system, and sending said first symbol response to said host;
   a device capturing said first symbol response sent from said storage array storing said first symbol response, sending said first symbol response to said host,
   wherein said host generates, by said storage management software, a second symbol call for a second operating system and sends said second symbol call for said second operating system to said device, the second operating system being different from the first operating system;
   said device sending said first symbol response to said host in response to receiving said second symbol call for said second operating system without providing additional storage arrays for testing said second symbol call for said second operating system; and
   the fibre channel network connecting said host, said storage array and said device.

8. The system according to claim 7, wherein said host has installed thereon the storage management software.

9. The system according to claim 7, wherein said storage array comprises one or more solid state storage devices.

10. The system according to claim 7, wherein said device comprises a network interface, an analyzer capability, and the memory for storing said first symbol response.

11. The system according to claim 10, wherein said device further stores an object graph of said first symbol call for said first operating system.

12. The system according to claim 7, wherein said host further generates a plurality of symbol calls for said first operating system.

13. The system according to claim 12, wherein said storage array further generates a plurality of symbol responses in response to said plurality of symbol calls for said first operating system.

14. The system according to claim 13, wherein said device further captures and stores said plurality of symbol responses.

15. The system according to claim 7, wherein said first symbol call for said first operating system is encoded in a first fibre channel frame packet.

16. The system according to claim 15, wherein said first symbol response is encoded in a second fibre channel frame packet.

* * * * *